Feb. 8, 1944.  A. F. VICTOR  2,341,301
IMPEDANCE OR DRAG FOR CINE-PROJECTORS
Filed April 26, 1943  3 Sheets-Sheet 1

Inventor:
Alexander Ferdinand Victor,
By:
Attorney.

Feb. 8, 1944.  A. F. VICTOR  2,341,301
IMPEDANCE OR DRAG FOR CINE-PROJECTORS
Filed April 26, 1943  3 Sheets-Sheet 2
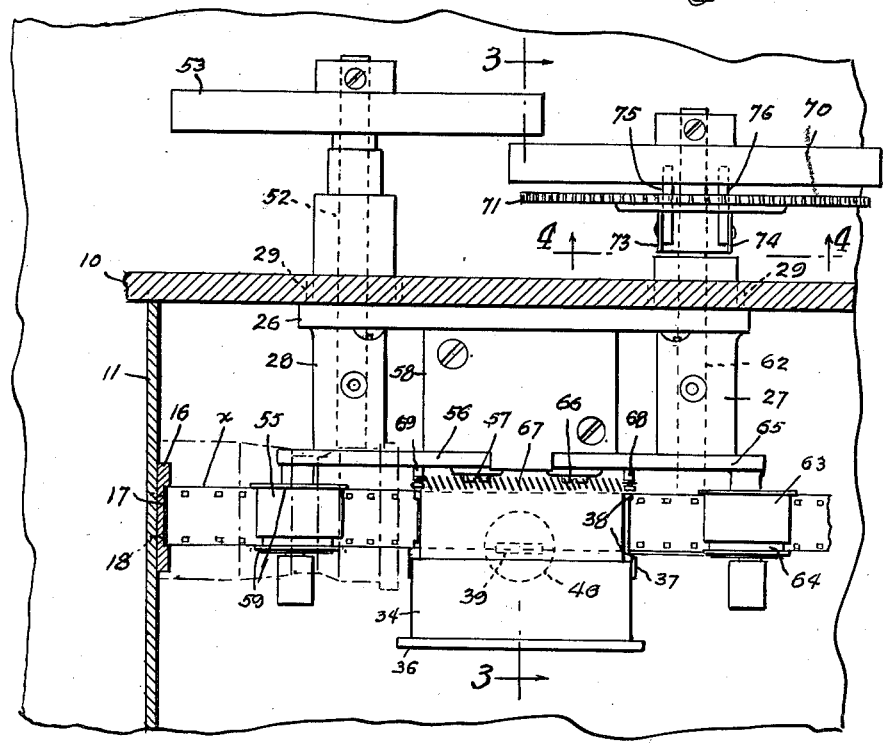
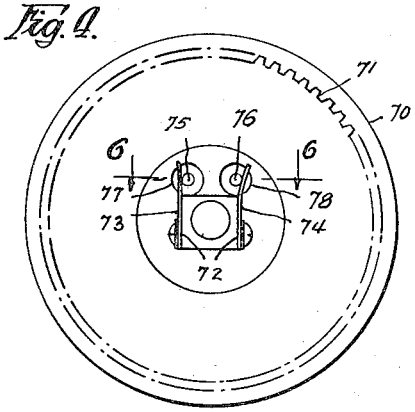
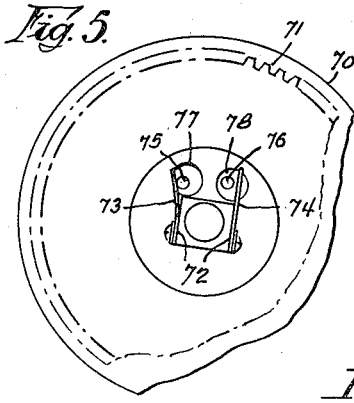
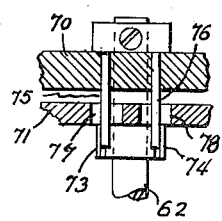
Inventor:
Alexander Ferdinand Victor,
By:
Attorney.

Patented Feb. 8, 1944

2,341,301

UNITED STATES PATENT OFFICE 2,341,301

IMPEDANCE OR DRAG FOR CINEPROJECTORS

Alexander Ferdinand Victor, New York, N. Y.

Application April 26, 1943, Serial No. 484,660

12 Claims. (Cl. 179—100.3)

My present invention relates to cinematographic projectors of the type used by amateurs wherein sound is reproduced from a track along the margin of the motion picture film. Specifically this invention is directed by means which effects an impedance action and a spring filter arrangement whereby a constantly even movement of the film is secured and the film is maintained positively in the optical plane of the sound optic device.

In cine-projectors which reproduce sound numerous irregularities occur which tend to change the speed of the film and thereby force the film out of the optical plane of the lens and slit-forming devices. Several irregularities which I will mention are improper or faulty teeth in the gears of the drive mechanism, accumulation of foreign matter on the teeth of the gear or the sprocket, an enlarged sprocket hole in the film, or a warped or shrunken portion of the film. An arcuate film track is provided adjacent the sound optic and it is desirable that the film be kept flat against this track while passing the axis of the optical unit. A continuously rotating sprocket moves or draws the film on the track and derives its motion from a gear or the like that is driven by the mechanism which actuates the intermittent feed and shutter of the cine-projector. The sprocket does not have direct connection with the gear, but there is a fly-wheel interpolated between the gear and sprocket so that, while the sprocket is moving the film over the track, the film is retarded by the fly-wheel and an impedance roller which it must drive. A presser-roller assists in holding the film firmly against the impedance roller. By means of a flexible connection between the fly-wheel and gear acts instantaneously to absorb or take up any "slack" which may occur in the film due to failure of the sprocket teeth to keep the film taut. The impedance fly-wheel is of considerable weight and rotates rapidly so that the filter springs, which form the flexible connection, do not normally affect the speed of the impedance element, but said filter springs do perform the function of taking up the slack between the sprocket and the retarding fly-wheel. By maintaining the film taut on the track at the location of the optical plane, the impedance fly-wheel will definitely control the speed of the film and guard it against any irregularities which may arise.

My invention aims to provide an apparatus of the character described that is simple in construction and compact in the arrangement of its parts; that is dependable in operation; that is easy to manipulate; and is novel in the design and disposition of its parts so that my improvements may be incorporated in a small projector that is especially adapted for amateur use. A still further object of my invention is to provide an impedance device and spring filter arrangement that is combined with the film track, the sound optic, and light source so that these parts constitute a complete unit that is capable of being readily attached to a cine-projector apparatus of the so-called "silent" type whereby the apparatus is converted to a "sound" type. Other objects and advantages of my invention will be apparent to persons skilled in the art after the construction and operation of my invention is understood from the within description.

I prefer to accomplish the numerous objects of my invention, and to practice the same, in substantially the manner hereinafter described and as more particularly pointed out in the appended claims. Reference is herein made to the accompanying drawings that form a part of this specification.

In the drawings:

Figure 2 is a top plan of the structure shown in the lower half of Figure 1.

Figure 4 is a front elevation on the plane of line 4—4, Figure 2, showing details of the spring filter.

Figure 5 is a detail view similar to Figure 4 showing the action of the spring filter.

Figure 6 is a sectional view taken on the plane of line 6—6 on Figure 4.

The drawings are to be understood as being more or less schematic and are for the purpose of disclosing a typical or preferred embodiment of my invention, and in these drawings like reference characters are employed to identify like parts wherever they appear in the divers views.

Figures 1, 8:
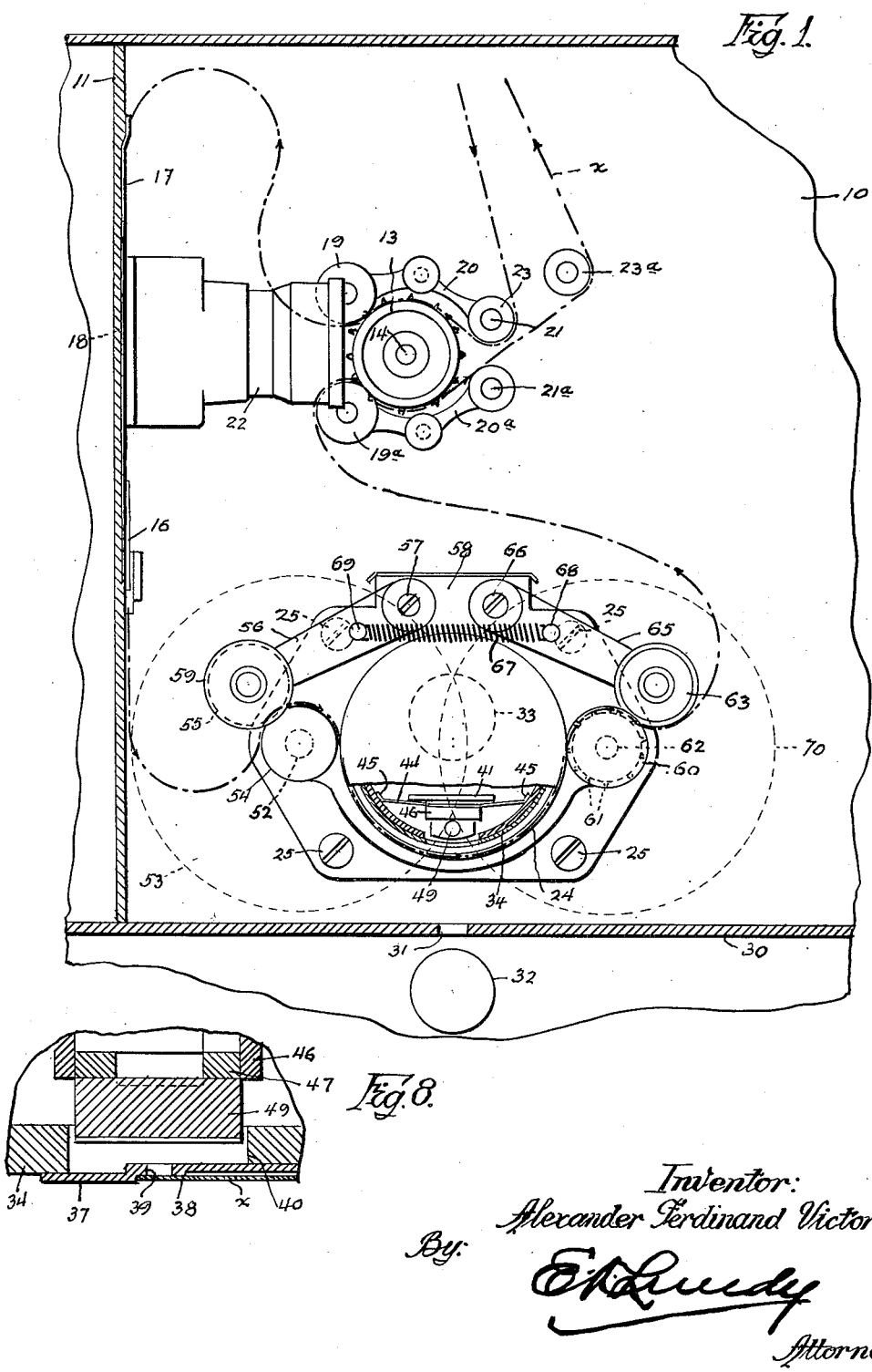
Figure 1 is a vertical elevation of a portion of a motion picture projecting apparatus showing my invention applied thereto.
Figure 8 is a section on line 8—8 of Figure 7.

My invention is shown as applied to a cinematographic sound projector employing 16 mm. film that is especially adapted for use by amateurs. It will be understood however that the principles of this invention are also applicable to types of projectors other than those used by amateurs. For amateur purposes the apparatus is quite compact in construction to permit convenience in handling and facility in use or operation. While only fragmentary portions of the projector are shown it will be understood that actuating portions of the intermittent film feed mechanism are enclosed in a suitable housing that is supported by a standard and the apparatus is stored in a compartment within a carrying-case or cabinet for easy handling. The horizontal top of the carrying-case or cabinet, conventionally illustrated in Figure 1, shows its relation to the adjacent parts of the projector. The novel construction of the cabinet or case is not the subject-matter of my present application, but in this connection it will be explained that the vertical partition 10 extends longitudinally of the cabinet to provide a standard or support for portions of the mechanism, and the adjacent sidewall of said case is in the form of a door-section that may be opened to permit access to the controls and other parts of the projector.

The body portion of the projector consists of an end compartment enclosing the intermittent film feeding devices, the shutter and their associated parts, and other portions of the mechanism are disposed upon the side of the partition 10 opposite that shown in Figure 1, the main film-moving sprocket 13 being mounted on the partition 10. This sprocket is anchored to the outer end of a driven spindle 14 that projects out of its bearing in the support or partition 10.

There is a lamp-house in the end compartment containing an electric bulb that supplies illumination for projecting the pictures, while on the cross-wall 11 of the compartment there is an elongated vertical opening that is closed by a vertically disposed plate 16 formed with a longitudinal depression 17 that provides a channel in which the film is guided in its movement past the projection aperture 18 in the guide alining horizontally with the light source and at the axis of the projected light beam.

The advancing portion of the film $x$ is formed into a feed loop between the sprocket 13 and the guide or channel 17, and after passing out of the lower portion of said guide the film is formed into another or take-up loop before reaching the sound reproducing drum. The feeding portion of the film is retained on the upper segment of the sprocket by a flanged and grooved roller 19 that is rotatable at the movable end of an arm 20 that swings on a pivot 21 projecting from the partition 10 and an idle roller 23 on a spindle 21 guides the film to the sprocket from the supply or feed reel (not shown).

The take-up or returning portion of the film is retained on the lower segment of sprocket 13 by a flanged and grooved roller 19$^a$ rotatable at the movable end of an arm 20$^a$ that swings on a pivot 21$^a$, which pivot also carries an idle roller 22$^a$ to guide the film away from the sprocket. Another flanged roller 23$^a$ guides the film to the rewind or take-up reel (not shown) after the film leaves the roller 22$^a$.

Suitable mechanism within the rear compartment 11 intermittently moves the film down through the guide channel 17 so that the frames on the film successively pass the light aperture 18 and are projected by means of the optical elements in the focusing lens tube 22. The rear portion of the lens tube is hingedly mounted on a threaded pintle or bolt which moves said tube up and down in front of the film guide channel, and also permits the lens tube to be swung horizontally away from the guide channel when "threading" the film through the projector preparatory to operating the apparatus.

A horizontal cylindrical boss 24 is mounted on the side of the partition or support 10 shown in Figure 1, and the said boss constitutes the central part of an irregularly shaped casting that is removably attached to the lower portion of said partition by bolts 25. The inner portion of the casting comprises a base-plate 26, of a generally hexagonal shape, the upper and lower corners of which are apertured to receive the bolts 25 for attaching the casting to the partition, and upon the sides of the boss 24 there are horizontally disposed elongated bearings 27 and 28 that are axially bored parallel to the axis of the central boss 24 and extend inwardly beyond the base-plate 26 so that they may be inserted in holes 29 in the partition. This construction permits the casting, and the parts mounted thereon, to be readily attached to or removed from the cine-projector without interference with the moving-picture displaying portion of the apparatus.

Figure 3:
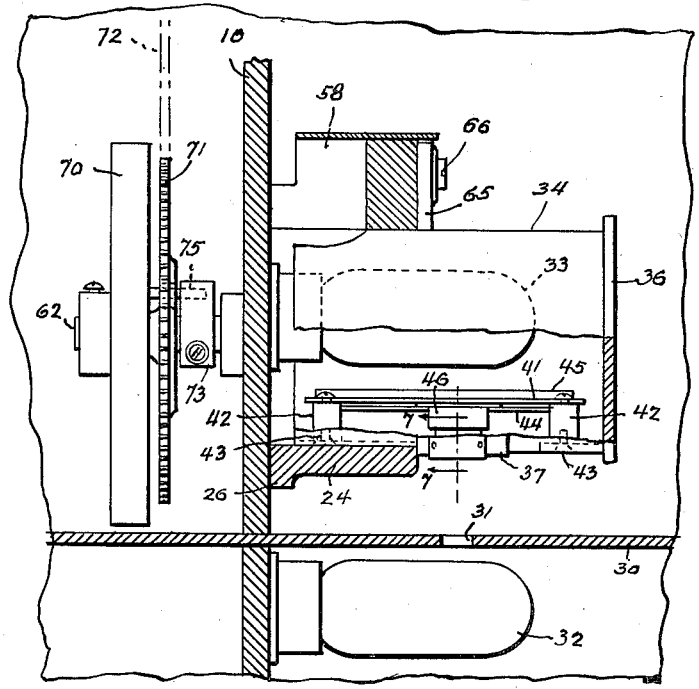
Figure 3 is a vertical elevation, looking at the right side of the structure shown in Figure 2, with a portion broken away.
Figure 7:
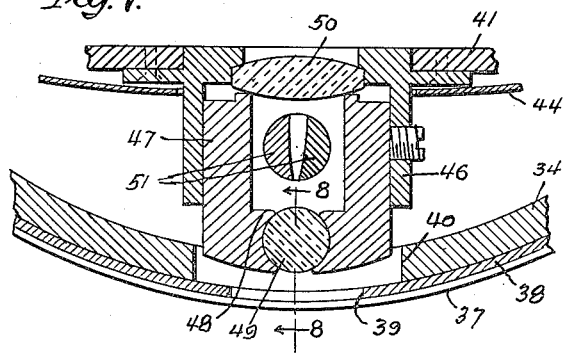
Figure 7 is a vertical section on line 7—7 of Figure 3, drawn to an exaggerated scale for clarity.

There is a horizontal wall 30 in the cabinet at which the partition terminates, and below the axis of the cylindrical boss 24 this horizontal wall has an opening 31 that alines vertically with a photo-electric cell 32 mounted in the chamber beneath the horizontal wall 30 and which is operatively connected in a suitable electric circuit. Adjacent the inner portion of the cylindrical boss 24 there is provision for mounting an exciter-lamp 33 that is interposed in a proper electric circuit, the arrangement being such that the exciter-lamp extends the desired distance into the central portion of said boss as shown in Figure 3.

A cylindrical drum 34 is inserted into the cylindrical boss 24 and surrounds the exciter lamp 33. This drum is removably secured in the boss by a screw that enters the boss 24 to engage the adjacent surface of the drum, and the outer end of the said drum is closed by a cover 36. The major portion of the drum 34 protrudes out of the boss and upon its under segment there is a semi-cylindrical or arcuate film guide 37 having longitudinally disposed parallel guide-shoulders 38 near its edges to support opposite margins of the film $x$ during its travel in an arcuate path on the drum. One of the shoulders of the track has an elongated slot 39 in its lower portion which is nearest the photo-electric cell so that said slot extends entirely across a "sound optic" unit that is positioned immediately above it. The sound-track on the margin of the film is adapted to register with this slot 39 when the film is disposed on and moving in the guide channel.

The drum completely surrounds and houses the exciter lamp and the optical unit containing slit-forming elements, and it is provided with a radially bored opening 40 of greater diameter than the length of slot 39. The "sound optic" unit is mounted upon the central portion of an elongated rectangular plate 41 that extends longitudinally in the lower portion of drum 34 and is adjustably mounted so that it may be moved towards and from the film guide 37. For the purpose of providing adjustment, threaded hollow stubs 42 are mounted on the plate 41 adjacent the ends thereof and screws 43, having their ends counter-sunk in the drum, are threaded into said stubs. A flexible metal strip 44 has its marginal portion deflected as at 45 to engage the inner surface of the drum, so that its central portion is disposed upon the lower face of the metal plate 41 and is provided with suitable openings through which "sound optic" unit and the stubs 42 are disposed. When the screws are rotated to move the plate 41 downwardly the metal strip 44 is flexed and maintains the stability of the mounting.

The "sound optic" embodies a hollow sleeve 46 mounted in an opening in the supporting plate 41 which permits light waves to pass axially through the sleeve and the plate. Within the sleeve there is a cylindrical body-member 47 with an axial bore extending part-way through it to provide an outer end wall 48 that is disposed near the wall of the drum adjacent the slot in the guide channel. A cylinder lens 49 is mounted in a horizontal bore extending across and through the end wall 48, which bore opens through the outer and inner faces of said endwall to permit passage of light waves to the photo-electric cell. There is a double convex condensing lens 50 in the opposite end of the sound-optic unit, and intermediate the lenses 49 and 50 there is a slit-forming device extending diametrically across the bore of the body member 47. The slit-forming device embodies preferably two substantially semi-cylindrical members 51 disposed side by side and the facing portions of these members are slightly concaved. At their ends the members have cylindrical cross-sections that axially aline with each other and permit them to be rotated to increase or diminish the transverse dimension of the minute gap between them to thereby control the size of the optical slit that is focused upon the marginal sound track of the film.

The emulsion on the film is usually the optical plane of the "sound-optic," and it is essential that the film be maintained at all times while moving on the guide track in the said optical plane in order to prevent "flutters" in the reproduced sound. The "sound-optic" may be properly adjusted to focus the slit in the optical plane by turning the screws 43 to bodily move the structure toward or away from the film. Irregularities in the mechanism or the film, such as previously herein mentioned, will tend to move the film out of the optical plane. To overcome such eventualities arising, I have provided means which constitute an impedance and spring-filter that definitely maintains the film in the optical plane by keeping it constantly in intimate contact with the guide shoulders 38 while the film is passing the slot 39 where the sound-track on the film is exposed to the light waves from the exciter lamp. By these means the film is maintained at all times under a constant tension upon the guide channel and moving at a constant speed.

The bearing boss 28 is bored to receive a spindle 52 that rotates therein and has its end, which is back of the partition or support 10, extended beyond its bearing where a balance-wheel 53, or other mass, is anchored to it. The opposite end of this spindle likewise projects beyond the bearing 28 and has a roller 54 secured to it. A presser member, preferably in the form of a roller 55, is rotatably carried upon the outer free end of a swinging presser arm 56 having its fulcrum end pivoted upon the smooth shank of a screw 57 that is screwed into a rectangular embossment 58 on the upper part of the casting above the drum 34. The presser-member or roller 55 has annular flanges 59 at its end edges that preferably extend down alongside the ends of the roller 54 to serve as guides for the film which is disposed between the roller 54 and presser member 55. As seen in Figure 1, the film is engaged by the elements just mentioned, and extends partly around the roller 54 and then downwardly under the drum 34 in the engagement with the arcuate guide channel with its margins moving upon the shoulders 38.

Upon leaving the guide channel on the drum, after moving approximately half-way around the drum, the film engages a sprocket 60 having a plurality of teeth 61 adjacent one of its ends to enter the perforations in a margin of the film. This sprocket is secured upon the extended end of a rotating spindle 62 that is journaled in the bearing boss 27 in the adjacent portion of the casing. A presser member or roller 63 bears against this sprocket roller 60 and has an annular groove 64 to accommodate the sprocket teeth 61, and said presser member is rotatably mounted upon the adjacent free end of a swinging presser arm 65. The other end of this arm 65 is fulcrumed upon the smooth shank of a screw 66 that is screwed into the embossment 58 above mentioned, and a coiled contraction spring 67, normally under tension, has one of its ends connected to a pin 68 on the presser arm 65, and its other end connected to a pin 69 on the other presser arm 56. The spring 67 is normally under tension and maintains the respective presser members 65 and 63 firmly urged toward their respective rollers and permits the presser arms 56 and 65 to be raised for the purpose of threading the film on the roller 54, the arcuate guide 37 and the sprocket roller 60.

The end of the spindle 62 which is opposite the sprocket 60, projects out of its bearing back of the partition 10 and has a fly wheel 70 anchored to it, and suitable means are provided for driving the spindle 62 and its sprocket 60 in order to withdraw the film from the arcuate guide channel 37 and form it into a loop prior to reaching the main drive-sprocket of the cine-projector. A large gear 71 is loosely mounted on spindle 62 between the end of bearing 27 and the flat hub of the fly-wheel, said gear deriving its movement from a driving gear schematically shown by the dot-dash or broken line 72 in Figure 3. This driving gear 72 may, if desired, be actuated by a gear that is fast on the spindle of the main feed sprocket 13, or it may be secured direct to the sprocket spindle. In either event, the large gear 71 is moved in synchronized relation with respect to the intermittent film feeding mechanism and the feed and take-up sprocket 13 of the cine-projector. The gear 71 has a spring-filter connection with the spindle 62 for driving the sprocket roller 60. In order to provide this connection the hub of the gear has oppositely disposed flattened portions 72 upon which short spring leaves 73 and 74 are secured in any suitable manner. The fly-wheel has a pair of spaced laterally disposed elements, preferably in the shape of pins 75 and 76 projecting from its side nearest the gear. These elements or pins pass through openings 77 and 78 in the body of the gear and engage facing portions of the ends of the spring leaves 73 and 74. Normally, both the spring leaves are flexed under tension, and the openings 77 and 78 are of larger dimensions than the transverse dimensions of the pins, thus permitting relative movement between the gear and the fly-wheel in either direction away from their normal positions.

When the structure is operating, the gear 71 drives the fly-wheel 70 through the medium of the spring leaves 73—74 and pins 75—76, thus rotating the spindle 62 of the sprocket roller 60. This causes the film to traverse the arcuate guide, and the portion of the film engaged with roller 54 and presser member 55 will rotate roller which in turn revolves the balance-wheel 53 on the roller 54 spindle 52. The film, while moving, is thus weighted by the revolving masses of the balance-wheel 53 and the fly-wheel 70, and the portion of the film traversing the arcuate guide is always taut because it is between these weighted masses. This maintains the film in the optical plane of the sound optic device. When the sprocket roller 60 pulls the film across the guide on the drum, the film is retarded by the balance-wheel 53 and the impedance roller 54 which are actuated by the moving film. So long as there is no irregularity the film will travel smoothly in the optical plane on the guide, but should irregularity occur the travel of the film is either retarded or speeded which would ordinarily cause it to be forced out of the optical plane. However, the flexible connection between the fly-wheel 70 and gear 71 immediately acts to take up any slack in the film which would be caused by failure of the sprocket roller 60 to keep the film taut. Due to the fact that the impedance balance-wheel 53 has considerable weight and revolves rapidly, the action of the filter springs 73—74 will not affect this speed but serve to dissipate or take up the slack between the sprocket roller and the retarding or impedance wheel 53. At the same time, by keeping the film from leaving contact with the arcuate guide (which is the site of the optical plane) it follows that the impedance wheel 53 controls the speed of the film and thereby protects the operation of the structure against irregularities.

It will be noted that the sound optic drum, impedance roller and sprocket roller, and their associated parts constitute a structural unit that may be readily attached to a "silent" cine-projector merely by removing the two mass wheels 53 and 70 together with the gear 71 and inserting the spindles and bearings through openings 29 in the partition 10 after which the previously removed parts are replaced.

What is claimed is:

1. A device of the kind described embodying a spindle; a sprocket fast on said spindle adapted to impart longitudinal movement to a film; a rotatable mass element fast on spindle; a driving element loose on said spindle; and means adapting said driving element for movement with said spindle and also independent thereof, said means embodying spaced yieldable members carried by said driving element; and spaced projections carried by said mass element, said projections maintaining said yieldable members normally under tension, said driving element provided with apertures through which said projections extend, whereby said apertures and projections are adapted to limit relative movement between said mass element and said driving element.

2. A device of the kind described embodying a spindle; a sprocket fast on said spindle adapted to impart longitudinal movement to a film, a fly-wheel fast on said spindle; a gear loose on said spindle; means for rotating said gear; and means adapting said gear for movement with said spindle and also independent thereof, said means embodying spaced yieldable members carried by said gear; and spaced projections carried by said fly-wheel and engaged with said yieldable members, said projections maintaining said yieldable members normally under tension.

3. A device of the kind described embodying a spindle; a sprocket fast on said spindle adapted to impart longitudinal movement to a film, a fly-wheel fast on said spindle; a gear loose on said spindle; means for rotating said gear; and means adapting said gear for movement with said spindle and also independent thereof, said means embodying spaced leaf springs disposed transverse to the axis of and carried by said gear; and spaced pins projecting laterally from and carried by said fly-wheel and engaged with said leaf springs, said pins maintaining said leaf springs normally flexed.

4. A device of the kind described embodying a spindle; a sprocket fast on said spindle adapted to impart longitudinal movement to a film; a fly-wheel fast on said spindle; a gear loose on said spindle, said gear provided with spaced apertures; means for rotating said gear; and means adapting said gear for movement with said spindle and also independent thereof, said means embodying spaced leaf-springs carried by said gear and disposed across said apertures; and spaced pins projecting laterally from said fly-wheel through said apertures and engaged with said leaf-springs, said pins maintaining said leaf-springs normally flexed.

5. A device of the kind described embodying a pair of rotatable spindles; impedance means actuated by one of said spindles; a film-engaged roller on the spindle which actuates said means; presser means maintaining the film on said roller; a fly-wheel on the other spindle; a drive element loose on the fly-wheel spindle; yieldable means operatively connecting said fly-wheel to said drive element; a film moving sprocket on said fly-wheel spindle; and an arcuate guide traversed by the film between said roller and said sprocket, said sprocket adapted to move the film across said guide whereby the film is adapted to rotate said roller and said impedance means.

6. A device of the kind described embodying a rotatable spindle; impedance means actuated by said spindle; a roller on said spindle adapted to be frictionally engaged by a strip of film; a second rotatable spindle spaced from the first-named spindle; a sprocket on the said second spindle, said sprocket engaged with and actuating the film; a fly-wheel fastened on said second spindle; a drive element loose on said second spindle; yieldable means operatively connecting said fly-wheel and said drive element; a drum intermediate said spindles; an arcuate guide on said drum traversed by film between said sprocket and said rollers; said drum and said guide having alined apertures across which a sound-track on the film is adapted to travel; and a sound-optic device within said drum adapted to focus on the sound-track of the film.

7. A device of the kind described embodying a rotatable spindle; impedance means actuated by said spindle; a roller on said spindle adapted to be frictionally engaged by a strip of film; a second rotatable spindle spaced from the first-named spindle; a sprocket on the said second spindle, said sprocket engaged with and actuating the film; a fly-wheel fastened on said second spindle; a drive element loose on said second spindle; yieldable means operatively connecting said fly-wheel and said drive element; a drum intermediate said spindles; an arcuate guide on said drum traversed by film between said sprocket and said roller; said drum and said guide having alined apertures across which a sound-track on the film is adapted to travel; a sound-optic within said drum adapted to focus on the sound-track of the film; a photo-electric cell, and an exciter lamp, said cell and said lamp disposed in coactive relation to said sound-optic.

8. A device of the kind described embodying a spindle; a sprocket fast on said spindle adapted to impart longitudinal movement to a film; a fly-wheel fast on said spindle; a gear loose on said spindle, said gear provided with spaced apertures; means for rotating said gear; spaced leaf-springs carried by said gear and disposed across said apertures; spaced pins projecting laterally from said fly-wheel through said apertures and engaged with said leaf-springs, said pins maintaining said leaf-springs normally flexed; and an impedance device engaged by the film prior to reaching said sprocket, whereby the film moved by said sprocket is adapted to actuate said impedance device.

9. A device of the kind described embodying a pair of rotatable spindles; impedance means actuated by one of said spindles; a film engaged roller on the spindle which actuates said means; presser means frictionally maintaining the film on said roller; a fly-wheel on the other spindle; a drive element loose on the fly-wheel spindle; yieldable means operatively connecting said fly-wheel to said drive element; a film moving sprocket on said fly-wheel spindle; a drum adapting the film for arcuate movement between said roller and said sprocket, said sprocket adapted to move the film across said guide whereby the film is adapted to rotate said roller and said impedance means; and sound translating devices associated with the drum and film, said devices embodying an optical system focused at the plane of the film traversing said drum.

10. A device of the kind described embodying an arcuate guide adapted to be traversed by a film; sound-translating devices adjacent said guide, said devices having a focal plane at a surface of the film traversing said guide; a plurality of rotatable masses disposed one on each side of said guide; means operatively connected to one of said masses and rotatable therewith, said means adapted to be engaged by the film and be rotated thereby prior to the film traversing said guide, whereby said mass is rotated by the movement of the film; driven means adapted to engage the film and impart longitudinal movement thereto, said driven means disposed upon the side of the guide opposite the rotatable means that is actuated by the film; and yieldable devices operatively connecting said driven means to the adjacent rotatable mass, whereby the film on the said guide is constantly maintained in optical plane of said sound-translating device.

11. A device of the kind described embodying a rotatable sprocket adapted to impart longitudinal movement to a film; a rotatable mass normally moving with said sprocket; sound-translating devices adjacent said guide, one of said devices comprising a sound-optic adapted to focus light waves upon a portion of the film on said guide; a second rotatable mass actuated by the film prior to the passage of the film on said arcuate guide; and yieldable means operatively connecting the first rotatable mass to said sprocket, whereby the portion of the film moving on said guide is constantly maintained thereon in the optical plane of said sound-translating devices.

12. A device of the kind described embodying an arcuate guide adapted to be traversed by a film; sound-translating devices adjacent said guide, said devices having a focal plane at a surface of the film traversing said guide; rotatable spindles disposed one on each side of said guide; a film engaging roller fast on one of said spindles, said roller adapted to be moved by the film; a balance-wheel fast on said roller spindle; a film driving sprocket fast on the other spindle, said sprocket adapted to impart longitudinal movement to the film, whereby said roller is rotated by the film and the film is moved on said guide; a second balance-wheel; and means operatively and yieldably connecting said second balance wheel to the sprocket spindle, whereby the portion of the film traversing said guide is maintained constantly in the optical plane of said sound-translating devices.

ALEXANDER FERDINAND VICTOR.